United States Patent
Jonas et al.

(10) Patent No.: US 9,338,001 B2
(45) Date of Patent: *May 10, 2016

(54) PRIVACY ENHANCED SPATIAL ANALYTICS

(71) Applicant: GLOBALFOUNDRIES U.S. 2 LLC, Hopewell Junction, NY (US)

(72) Inventors: Jeffrey J. Jonas, Las Vegas, NV (US); Kirk J. Krauss, Los Gatos, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,085

(22) Filed: Jun. 23, 2014

(65) Prior Publication Data

US 2015/0101061 A1    Apr. 9, 2015

Related U.S. Application Data

(63) Continuation of application No. 14/045,718, filed on Oct. 3, 2013.

(51) Int. Cl.
| | |
|---|---|
| *H04L 9/00* | (2006.01) |
| *H04L 9/32* | (2006.01) |
| *H04L 9/08* | (2006.01) |
| *G06F 21/60* | (2013.01) |
| *G06F 21/62* | (2013.01) |
| *H04L 29/06* | (2006.01) |

(52) U.S. Cl.
CPC ............ *H04L 9/0861* (2013.01); *G06F 21/60* (2013.01); *G06F 21/6209* (2013.01); *H04L 9/0872* (2013.01); *H04L 63/0428* (2013.01); *G06F 2221/2111* (2013.01); *H04L 9/08* (2013.01); *H04L 63/08* (2013.01)

(58) Field of Classification Search
CPC .................................. H04L 9/08; H04L 63/08
USPC ............................................. 380/44; 713/168
See application file for complete search history.

(56) References Cited

U.S. PATENT DOCUMENTS

| | | |
|---|---|---|
| 4,773,861 A | 9/1988 | Dufour |
| 5,895,465 A | 4/1999 | Guha |
| 5,991,758 A | 11/1999 | Ellard |

(Continued)

FOREIGN PATENT DOCUMENTS

| | | |
|---|---|---|
| CN | 102567439 A | 7/2012 |
| CN | 102568035 A | 7/2012 |

(Continued)

OTHER PUBLICATIONS

English Abstract and Machine Translation for JP2010237832A, published Oct. 21, 2010, Total 27 pp.

(Continued)

*Primary Examiner* — Aravind Moorthy
(74) *Attorney, Agent, or Firm* — Anthony Canale; Hoffman Warnick LLC

(57) ABSTRACT

Method, system, and computer program products, implementing and using techniques for processing data representing observations of entities. An anonymized key is generated. The anonymized key represents a spacetime region with which an entity is associated. The spacetime region represents a spatial region and a time interval. The entity is associated with the spacetime region based on spacetime coordinates for the entity.

12 Claims, 8 Drawing Sheets

(56) References Cited

U.S. PATENT DOCUMENTS

| | | |
|---|---|---|
| 6,943,724 B1 | 9/2005 | Brace et al. |
| 7,096,259 B1 | 8/2006 | Gray et al. |
| 7,366,632 B2 | 4/2008 | Hamann et al. |
| 7,373,246 B2 | 5/2008 | O'Clair |
| 7,926,111 B2 | 4/2011 | Oliver et al. |
| 7,966,291 B1 | 6/2011 | Petrovic et al. |
| 8,015,137 B2 | 9/2011 | Allen et al. |
| 8,204,213 B2 | 6/2012 | Hunt et al. |
| 8,229,766 B2 | 7/2012 | Carttar et al. |
| 8,244,502 B2 | 8/2012 | Hamann et al. |
| 8,306,794 B2 | 11/2012 | Hamann et al. |
| 2002/0095319 A1 | 7/2002 | Swart et al. |
| 2003/0130987 A1 | 7/2003 | Edlund et al. |
| 2004/0203868 A1 | 10/2004 | Eidson |
| 2004/0210763 A1 | 10/2004 | Jonas |
| 2007/0067285 A1 | 3/2007 | Blume et al. |
| 2007/0132767 A1 | 6/2007 | Wright et al. |
| 2008/0033933 A1 | 2/2008 | Cookson et al. |
| 2008/0098008 A1 | 4/2008 | Eid |
| 2008/0120271 A1 | 5/2008 | Hunt et al. |
| 2008/0125969 A1 | 5/2008 | Chen et al. |
| 2008/0243885 A1 | 10/2008 | Harger et al. |
| 2008/0288193 A1 | 11/2008 | Claassen et al. |
| 2009/0006349 A1 | 1/2009 | Fuxman et al. |
| 2009/0012898 A1 | 1/2009 | Sharma et al. |
| 2009/0055719 A1 | 2/2009 | Cossins et al. |
| 2009/0077113 A1 | 3/2009 | Fidaali et al. |
| 2009/0106242 A1 | 4/2009 | Mcgrew et al. |
| 2009/0157593 A1 | 6/2009 | Hayashi et al. |
| 2009/0164811 A1 | 6/2009 | Sharma et al. |
| 2009/0234869 A1 | 9/2009 | Azvine et al. |
| 2009/0248687 A1 | 10/2009 | Su et al. |
| 2009/0248738 A1 | 10/2009 | Martinez et al. |
| 2009/0265106 A1 | 10/2009 | Bearman et al. |
| 2009/0326879 A1 | 12/2009 | Hamann et al. |
| 2009/0326884 A1 | 12/2009 | Amemiya et al. |
| 2010/0197318 A1* | 8/2010 | Petersen et al. ............ 455/456.1 |
| 2011/0040532 A1 | 2/2011 | Hamann et al. |
| 2011/0060561 A1 | 3/2011 | Lugo et al. |
| 2011/0087495 A1 | 4/2011 | O'Neill et al. |
| 2011/0246494 A1 | 10/2011 | Adair et al. |
| 2011/0302128 A1 | 12/2011 | Hayashi et al. |
| 2012/0029956 A1 | 2/2012 | Ghosh et al. |
| 2012/0084859 A1 | 4/2012 | Radinsky et al. |
| 2012/0089859 A1 | 4/2012 | Wang et al. |
| 2012/0106738 A1 | 5/2012 | Belenkiy et al. |
| 2012/0166347 A1 | 6/2012 | Lacal |
| 2012/0226889 A1 | 9/2012 | Merriman et al. |
| 2012/0320815 A1 | 12/2012 | Massena |
| 2014/0019544 A1 | 1/2014 | Palmert |
| 2014/0123300 A1* | 5/2014 | Jung et al. ........................ 726/26 |
| 2014/0257740 A1 | 9/2014 | Hamann et al. |
| 2014/0270482 A1 | 9/2014 | Chakraborty et al. |
| 2015/0098565 A1 | 4/2015 | Jonas et al. |
| 2015/0101061 A1 | 4/2015 | Jonas et al. |

FOREIGN PATENT DOCUMENTS

| | | |
|---|---|---|
| EP | 2652887 | 6/2014 |
| JP | 2010237832 A | 10/2010 |
| WO | 2010065429 | 6/2010 |
| WO | 2012082722 | 6/2012 |

OTHER PUBLICATIONS

Final Office Action 1, Dec. 5, 2014, for U.S. Appl. No. 13/585,066, filed Aug. 14, 2012 by G.G. Adair et al., Total 16 pp. [54.96 (FOA1)].

International Search Report, Dec. 2, 2014, for PCT/JP2014/004558, Total 2 pp.

International Search Report and Written Opinion, Dec. 2, 2014, for PCT/JP2014/004558, Total 2 pp.

Notice of Allowance, Nov. 28, 2014, for U.S. Appl. No. 12/752,386, filed Apr. 1, 2010 by G.G. Adair et al., Total 16 pp. [57.187 (NOA)].

Office Action 1, Jul. 30, 2014, for U.S. Appl. No. 13/585,066, filed Aug. 14, 2012 by G.G. Adair et al., Total 15 pp. [54.96 (OA1)].

Response to Office Action 1, Oct. 30, 2014, for U.S. Appl. No. 13/585,066, filed Aug. 14, 2012 by G.G. Adair et al., Total 10 pp. [54.96 (ROA1)].

Response to Office Action 3, Jul. 30, 2014, for U.S. Appl. No. 12/752,386, filed Apr. 1, 2010 by G.G. Adair et al., Total 13 pp. [57.187 (ROA3)].

Singla, P. and P. Domingos, "Entity Resolution with Markov Logic", Data Mining, 2006, Department of Computer Science and Engineering, ICDM'06, Sixth International Conference on IEEE, 2006. [Online], <retrieved Jul. 22, 2014>. <http://www.cse.iitd.ac.in/~parags/papers/erml-icdm06.pdf>, Total 11 pp.

Whang, S.E., O. Benjelloun, and H. Garcia-Molina, "Generic Entity Resolution with Negative Rules", The VLDB Journal, The International Journal on Very Large Data Bases 18.6 (2009): 1261-1277. Received: Mar. 27, 2008, Revised: Jan. 7, 2009, Accepted: Jan. 12, 2009, © Springer-Verlag 2009, Published online: Feb. 28, 2009, [online] <retrieved Jul. 22, 2014> <http://swhig.web.unc.edu/files/2011/10 1negativerules.pdf>, Total 17 pp.

Whang, S.E., and H. Garcia-Molina, "Entity Resolution with Evolving Rules", Proceedings of the VLDB Endowment, vol. 3, No. 1, Computer Science Department, Stanford University, © 2010 VLDB Endowment, Total 12 pp. [Also pp. 1326-1337].

Office Action 1, Dec. 18, 2014, for U.S. Appl. No. 14/045,718, filed Oct. 3, 2013 by J.J. Jonas et al., Total 21 pp. [57.351 (OA1)].

Preliminary Amendment, Jun. 23, 2014, for U.S. Appl. No. 14/045,718, filed Oct. 3, 2013 by J.J. Jonas et al., Total 5 pp. [57.351 (PrelimAmend)].

Christen, P. and R. Gayler, "Towards Scalable Real-Time Entity Resolution Using a Similarity-Aware.InvertedIndex Approach",© 2008, Australian Computer Society, Inc., Total 10 pp (Also The Australian National University, DCanberra ACT 0200, 2008).

Dey, D.; Sarkar, S.; De, P.;, "A distance-based approach to entity reconciliation in heterogeneous databases," Knowledge and Data Engineering, IEEE Transactions on , vol. 14, No. 3, pp. 567-582, May/Jun. 2002doi: 10.11 09/TKDE.2002.1000343.

Geohash: From Wikipedia, the free encyclopedia. <"http://en.wikipedia.org/w/index.php?title=Geohash&oldid=543362297>: Downloaded Apr. 9, 2013, pp. 1-6.

http://en.wikipedia.org/wiki/Circle_of_latitude, "Circle of latitude" printed Jul. 24, 2013.

ISEBOX. © 2010 HumanGeo, LLC: <http://www.thehumangeo.com/solutions_isebox.php>: Download Apr. 9, 2013. pp. 1-2.

Jeff Jonas "Entity Resolution Systems vs. Match Merge/Merge Purge/List De-duplication Systems". Sep. 25, 2007.http:/ /jeffjonas.typepas.com/jeff_jonas/2007 /09/entity-resoluti. html.

Jonas, J., "Threat and Fraud Intelligence, Las Vegas Style",© 2006 IEEE, Total 8 pp.

Kang, H., L Getoor, B. Shneiderman, M. Bilgic, and L Licamele, "Interactive Entity Resolution in Relational Data: A Visual Analytic Tool and Its Evaluation", IEEE Trans. on vol. 14, No. 5, Sep.-Oct. 2008, pp. 999-1014, DTotal16 pp.

Mailin, B. and L Sweeney, "EN RES: A Semantic Framework for Entity Resolution Modelling", School of Computer Science, Carnegie Mellon University, Nov. 2005, Total 18 pp.

Pugh, William: "Skip Lists: A Probabilistic Alternative to Balanced Trees": Communications of the ACM: vol. 33 Issue 6. NewYork, NY. Jun. 1990. 8 pp.

Sheth, A. and M. Perry, "Traveling the Semantic Web Through Space, Time, and Theme",© 2008 IEEE, Total 6 pp (Also IEEE Internet Computing, vol. 12, Iss. 2, Mar.-Apr. 2008, pp. 81-86).

U.S. Patent Application with U.S. Appl. No. 13/585,066, filed Aug. 14, 2012, entitled "Context Accumulation Based on Properties of Entity Features", invented by Adair, G. G., R.J. Butcher, and J.J. Jonas, Total 36 pp. [54.96 (Appln)].

Whitney, Bill: "Skip Lists in C++": Dr. Dobb's The World of Software Development. Nov. 1, 1998. URL:http://www.drdobbs.com/cpp/skip-lists-in-c/184403579. Downloaded Apr. 9, 2013. pp. 1-12.

Zhang, Jie. Dissertation: "Spatio-Temporal Aggregates over Streaming Geospatial Image Data": Jun. 2007. <http://www.cs.ucdavis.edu/research/tech-reports/2007/CSE-2007-29.pdf> Downloaded Apr. 9, 2013. pp. 1-145.

(56) References Cited

OTHER PUBLICATIONS

Amendment 1, Jul. 16, 2012, for U.S. Appl. No. 12/752,386, filed Apr. 1, 2010 by G.G. Adair et al., Total 14 pp.[57.187 (Amend1)].
Amendment 2, Dec. 10, 2012, for U.S. Appl. No. 12/752,386, filed Apr. 1, 2010 by G.G. Adair et al., Total 15 pp. [57.187 (Amend2)].
Final Office Action 1, Sep. 10, 2012, for U.S. Appl. No. 12/752,386, filed Apr. 1, 2010 by G.G. Adair et al., Total 20 pp. [57.187 (F0A1)].
Office Action 1, Mar. 28, 2012, for U.S. Appl. No. 12/752,386, filed Apr. 1, 2010 by G.G. Adair et al., Total 19 pp. [57.187 (OA1)].
Office Action 3, Apr. 30, 2014, for U.S. Appl. No. 12/752,386, filed Apr. 1, 2010 by G.G. Adair et al., Total 15 pp. [57.187 (OA3)].
U.S. Patent Application with U.S. Appl. No. 14/045,718, filed Oct. 3, 2013, entitled "Privacy Enhanced Spatial Analytics", invented by J.J. Jonas et al., Total 49 pp. [5T351 (Appln)].
Preliminary Amendment, Jun. 18, 2014, for U.S. Appl. No. 14/045,718, filed Oct. 3, 2013 by J.J. Jonas et al., Total 5 pp. [57.351 (PrelimAmend)].
Written Opinion, Dec. 2, 2014, for International Application No. PCT/JP2014/004558, Total 5 pp.
Response to Final Office Action, Feb. 27, 2015, for U.S. Appl. No. 13/585,066, filed Aug. 14, 2012 by G. G. Adair et al., Total 11 pp. [54.96 (RFOA)].
Office Action 3, Apr. 8, 2015, for U.S. Appl. No. 13/585,066, filed Aug. 14, 2012 by G.G. Adair et al., Total 8 pp. [54.96 (OA3)].
Response to Office Action 3, Jul. 8, 2015, for U.S. Appl No. 13/585,066, filed Aug. 14, 2012 by G.G. Adair et al., Total 11 pp. [54.96 (ROA3)].
U.S. Patent Application, Jun. 30, 2015, for U.S. Appl. No. 14/788,185, filed Jun. 30, 2015, by Kirk K. Krauss et al., Total 43 pp. [57.355 (Appln)].
Maludrottu, S., M. Beoldo, M. Soto Alvarez, and C. Regazzoni, "A Bayesian Framework for Online Interaction Classification", 2010 Seventh IEEE International Conference on Advanced Video and Signal Based Surveillance, © 2010 IEEE, Total 6 pp.
Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.
Mell, P. and T. Grance, "The NIST Definition of Cloud Computing (Draft)", Jan. 2011, Computer Security Division Information Technology Laboratory National Institue of Standards and Technology, Total 7 pp.
Moussa, W.A., J. Jessel, and E. Dubois, "Notational-based Prototyping of Mixed Interactions", In Proceedings of the 5th IEEE and ACM International Symposium on Mixed and Augmented Reality, © 2006 IEEE, Total 2 pp.
Wikipedia, "Vincenty's Formulae", [online], [Retrieved on Jun. 29, 2015]. Retrieved from the Internet at <URL: https://en.wikipedia.org/wiki/Vincenty%27s_formulae>, page last modified on Apr. 22, 2015, Total 5 pp.
Notice of Allowance 2, May 18, 2015, for U.S. Appl. No. 12/752,386, filed Apr. 1, 2010 by G.G. Adair et al., Total 11 pp. [57.187 (NOA2)].
Response to Office Action 1, Mar. 30, 2015, for U.S. Appl. No. 14/045,718, filed Oct. 3, 2013 by J.J. Jonas et al., Total 9 pp. [57.351 (ROA1)].
Final Office Action, Jul. 14, 2015, for U.S. Appl. No. 14/045,718, filed Oct. 3, 2013 by J.J. Jonas et al., Total 19 pp. [57.351 (FOA)].
English Abstract for EP2652887, published on Jun. 25, 2014, Total 2 pp.
English Abstract for CN102567439A, published on Jul. 11, 2012, Total 1 p.
English Abstract for CN102568035A, published on Jul. 11, 2012, Total 1 p.
Notice of Allowance 3, Aug. 26, 2015, for U.S. Appl. No. 12/752,386, filed Apr. 1, 2010 by G.G. Adair et al., Total 11 pp. [57.187 (NOA3)].
Response to Final Office Action, Aug. 21, 2015, for U.S. Appl. No. 14/045,718, filed Oct. 3, 2013 by J.J. Jonas et al., Total 11 pp. [57.351GF (RFOA)].

* cited by examiner

STB determination –
inclusive

Entity

| aa bb | aa ee | aa hh |
|---|---|---|
| aa cc | aa ff | aa ii |
| aa dd | aa gg | aa jj |

Precision
(in meters,
e.g. 120)

Circle of inclusion
(STBs are generated for any
graticules intersected by the
circle)

Slider
Threshold
Percentage
(e.g. 50%)

FIG. 4

Entity

| aa bb | aa ee | aa hh |
|---|---|---|
| aa cc | aa ff | aa ji |
| aa dd | aa gg | aa jj |

Precision
(in meters,
ie. 120)

Slider
Threshold
Percentage
(e.g. 50%)

PRIVACY ENHANCED SPATIAL ANALYTICS

BACKGROUND

The present invention relates to data analytics, and more specifically, to privacy enhanced spatial and temporal analytics. Some analytics associate entities (such as ships) with their features (such as gross tonnage) and feature elements (such as unit of measure and gross weight).

Spatial and temporal analytics further allow entities to be associated with space and time data. Some spatial and temporal analytics use an entity feature known as a SpaceTimeBox (STB). An STB reflects a spatial region and a time interval, at a specific granularity. Any event, that is, any point in spacetime specified by its time and place, can be assigned to at least one STB. When an entity, such as a ship, is associated with an event, other entities can be compared with the entity and be associated with that entity's spatial location at a certain time at a granularity defined by the STB's granularity. In many cases, the STB granularity is configurable, as are parameters that allow for filtering of STBs in various conditions. The STB functionality provides spatial and temporal reasoning capabilities for advanced entity resolution, relationship awareness, and insight/relevance detection.

Motion processing typically relies on quantization of space and time, thus making STBs useful for this purpose as well. The motion of entities with respect to STBs can be used to detect specific entity behavior, in real time, which can be published to downstream analytic applications. The activities of entities over time as quantized into intervals also can be used to detect specific entity behavior that also can be published to downstream analytic applications.

While spatial, temporal, and motion processing data are considerably valuable and telling, organizations that collect such data must be very careful in terms of privacy, civil liberty protections, and how that data may be revealed. On the one hand, organizations can apply such data to provide localeaware customer services (i.e. Location Based Services (LBS)), fraud detection via motion processing, and geographically-targeted marketing offers for consumers, to name a few possibilities. On the other hand, challenges can arise. For example, two different organizations or two different groups within the same organization may each have space and/or time data that they do not want to share freely with each other. Yet it may still be legal and beneficial for both organizations or groups to know whether their respective spatial and/or temporal data concerns a similar event, or near events, without revealing to one another the actual spacetime coordinates (e.g., a longitude, latitude, and a datetime value) of those events. Thus, there is a need to protect the spatial and temporal data that is collected and to privacy-enhance spatial and temporal data when it is shared or compared between parties.

SUMMARY

According to one aspect of the present invention, methods and apparatus are provided, including computer program products, implementing and using techniques for processing data representing observations of entities. An anonymized key is generated. The anonymized key represents a spacetime region with which an entity is associated. The spacetime region represents a spatial region and a time interval. The entity is associated with the spacetime region based on spacetime coordinates for the entity The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

FIG. 4 is a schematic view of a threshold percentage selection for including items in more than one STB using a circle of inclusion, in accordance with one embodiment.

FIG. 5 is a schematic view of a threshold percentage selection for including items in more than one STB using sampling points, in accordance with one embodiment.

DETAILED DESCRIPTION

Overview

Figure 1:
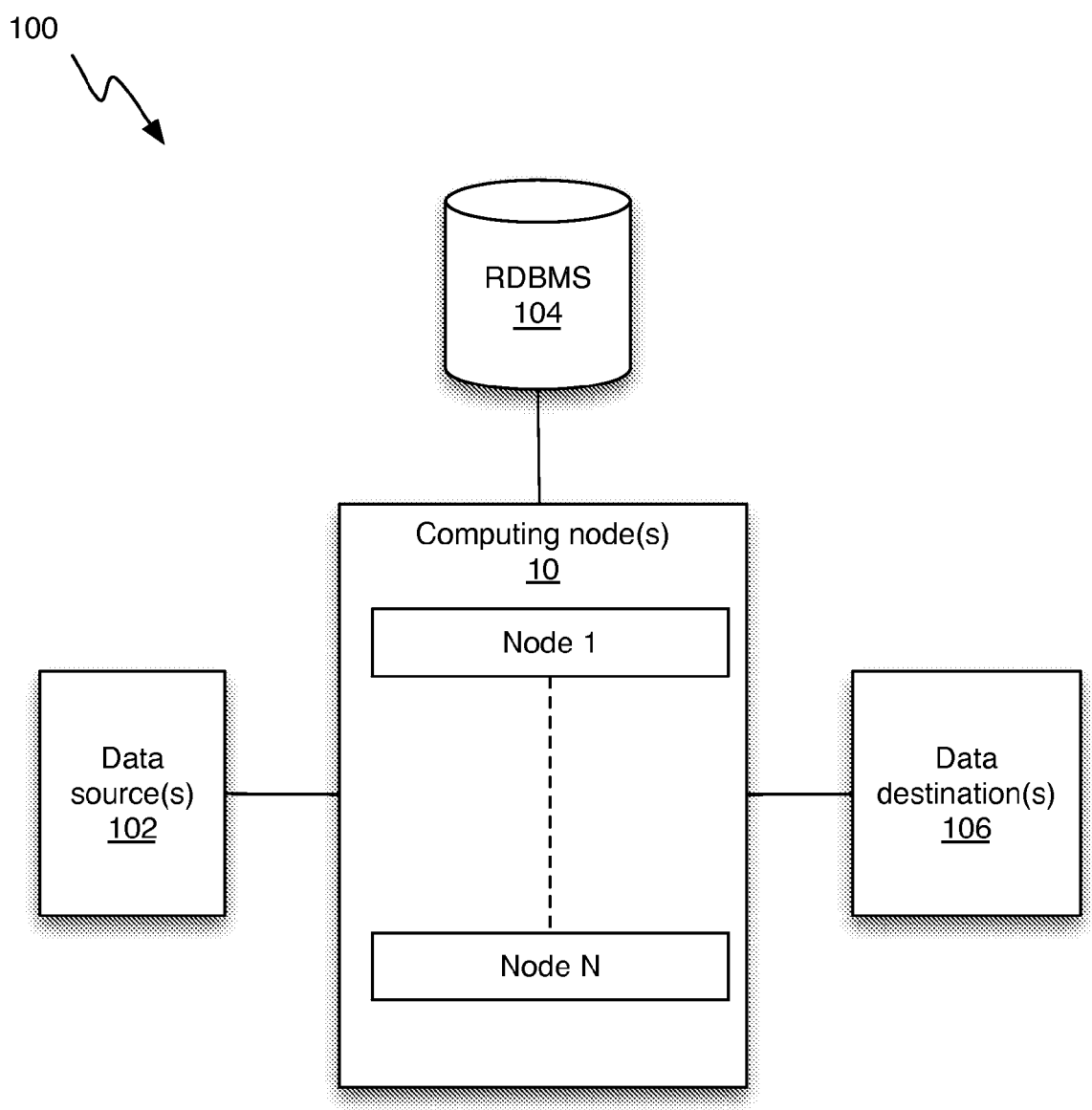
FIG. 1 is a schematic block diagram showing a system for motion processing, in accordance with one embodiment.

The various embodiments described herein pertain to realtime analysis of events. As was described above, analytics engines can associate entities with events via STBs, each of which reflects both a spatial region and a time interval. The embodiments described herein address issues that may occur when entity data are collected and associated with STBs, as well as how the data can be subsequently processed and shared anonymously between parties to ensure the privacy of the data.

In one embodiment specific to geospatial motion processing, STBs can be created by STB calculator routines implemented, for example, as a plugin module in an analytics engine, based on an event (i.e., an entity being observed at a particular geospatial location and a particular time), by using a geohash public-domain geospatial-quantizing algorithm, along with a simple time-quantizing algorithm. The routines concatenate the algorithms' outputs to form an STB key for the event, which can subsequently be anonymized using various anonymization techniques that will be described in further detail below.

The STB key can be specific to a spatial region and a time interval containing the event. When two entities, such as ships, both have STB keys as features, an analytics engine can compare the two STB keys to determine whether the entities are in the same generalized region of space and time, whether they are in adjacent generalized regions of space and time, or otherwise. The analytics engine can use this information to determine whether entities are related by their locations.

Given sufficient granularity, the analytics engine also can use this information, along with other information about the entities, to determine whether the entities are one and the same.

The flexible configurability of time and space generalization allows for outputting of multiple concurrent keys for use together with exact-match comparison of STBs to enable such things as advanced entity resolution, relationship awareness, and insight/relevance detection. The concurrent keys can reflect STBs of "tighter" and "looser" granularities, for a single observed entity. The STB comparison enables detection of, among other things, "hang outs" in a certain set of STBs. A single STB may at any given time contain zero, few, or many observed entities. The various embodiments of the invention allow rapid identification of any entities that are newly associated with an STB, and further processing of these identified entities. These features will be described in further detail below.

The privacy-preserving methods of anonymized STBs, which will be described herein, allow multiple parties to take records representing entities that have space and time attributes, to generalize the entities' space and time attributes into STBs, to anonymize the STBs into anonymized STB keys (i.e., strings that represent the anonymized STBs)—also referred to as "anonymized keys" herein—and only then to exchange the anonymized STB keys. Thus, the methods can be described as "allowing discovery without disclosure" of same or near spacetime coordinate date. This can be useful, for example, in a situation where two organizations each have 1000 STBs, and both organizations want to find out which of their respective entities (each being associated with an STB) are near the other organization's entities, but neither organization wants to reveal its 1000 entity locations to the other organization. Comparing the two sets of STBs will reveal those entities that are near each other in space and time. For example, assume that such a comparison reveals that three entities share an anonymized STB feature. In other words, the anonymized STB keys are the same—reflecting the underlying (obfuscated) spacetime data for these entities is the same or to a degree close. This can indicate that all the other 997 entities are uninteresting and that their corresponding data do not need to be shared.

The following is an example of how STBs can be used, in order to enhance the understanding of the general concepts of the various embodiments. This example describes a business process, but as the skilled person realizes, STBs can be used in many other types of processes as well. Suppose a wireless communications provider possesses geospatial data about where its subscribers' mobile devices are in space and time. A sandwich shop franchise may want to improve business in its underperforming shops, but may not want to reveal the locations of those underperforming shops to the wireless communications provider. Therefore, the sandwich shop franchise creates 50 STBs in the form of anonymized STB keys representing shop locations on particular days and times. Since the STB keys are anonymized, they can be shared freely with the wireless communications provider without revealing the actual days and times. By comparing the anonymized STB keys from the sandwich shop franchise with the wireless communications provider's data, it is possible to determine, for example, when subscribers from the wireless communications provider are near an underperforming sandwich shop, possibly triggering a business process e.g., to deliver an advertisement for that sandwich franchise to those subscribers via their mobile devices. In this manner, the mobile operator only learns underperforming sandwich shop locations that intersect a subscriber current or forecast location. The wireless communications provider will not thereby learn about other underperforming shops of the sandwich shop franchise. It should be readily apparent to those of ordinary skill in the art that a key advantage of the various embodiments of this invention is the ability to provide privacy enhancing space-time analytics.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowcharts and/or block diagram block or blocks.

FIG. 1 shows a schematic of an example of a system (100) used for motion processing, in accordance with one embodiment. As can be seen in FIG. 1, the system (100) includes one or more computing nodes (10), which collaborate as will be described in further detail below to process data received in inbound messages from one or more data sources (102). Each node (10) can be an independent computer or processor that contributes to a larger task of performing the techniques described herein, for a given set of entities and events specified by the inbound messages from the data source(s) (102). One example of a data source is the Automatic Identification System (AIS), which is an automatic tracking system used on oceangoing vessels and by vessel traffic services (VTS) for identifying and locating vessels by electronically exchanging data amongst vessels, AIS base stations, and orbiting satellites. It should be realized, though, that this is merely one example and that people having ordinary skill in the art can easily come up with other alternatives of data sources that are suitable for use in motion processing in accordance with the techniques presented herein.

The nodes (10) are connected to a shared Relational Database Management System (RDBMS) (104), which can collect data from the nodes (10) and provide data to the nodes (10). The shared RDBMS (104) is only one example of a suitable basis for analytics processing and/or motion processing and is not intended to suggest any limitation as to the scope of use or functionality of embodiments of the invention described herein. The RDBMS (104) can contain, for example, data about data sources, observations, entities, features, and elements. A data source is usually a database table, query or extract from a system of record. An observation occurs when a record is added, changed, or deleted in a data source. An entity is usually a particular type of record in a database table like a customer master record or a transaction record. A feature is a particular piece of information about an entity. Sometimes a table contains multiple fields that in fact describe the same thing. A feature may be represented by a group of fields that all describe the same thing. Many fields represent features all by themselves, but some can be grouped into a higher level. For instance, names and mailing addresses usually contain multiple fields or elements. An element is a further breakdown of a feature, such as the postal code that forms part of a typical address, and is usually represented by a field in a table.

By collecting this type of information in the shared RDBMS (104), the computing nodes (10) can work together to compare entities and features against each other and to determine entities sharing features, whether these features be anonymized STB keys, or otherwise. The entities sharing features can be provided in an outbound message to one or more data destination(s) (106), which can be defined by a user. One example of a data destination includes an analytics engine (as its data supply).

It should be realized that motion processing is merely one example of an area in which the techniques presented herein may be used, and that persons having ordinary skill in the art can easily come up with other alternatives of data destinations that are suitable for use. For example, other data destinations can include machine learning systems, automated navigation advisers for travelers (like the dashboard-mounted kind, or for hikers), systems for plotting the motion of astronomical objects, and systems for the study of particle physics, just to mention a few examples. It should also be realized that while only one data source (102), one RDBMS (104) and one data destination (106) are illustrated in FIG. 1, in a real-life scenario, there may be multiple data sources (102), multiple (or zero) RDBMSs (104) and multiple data destinations (106) included in the motion processing system (100).

Figure 2:
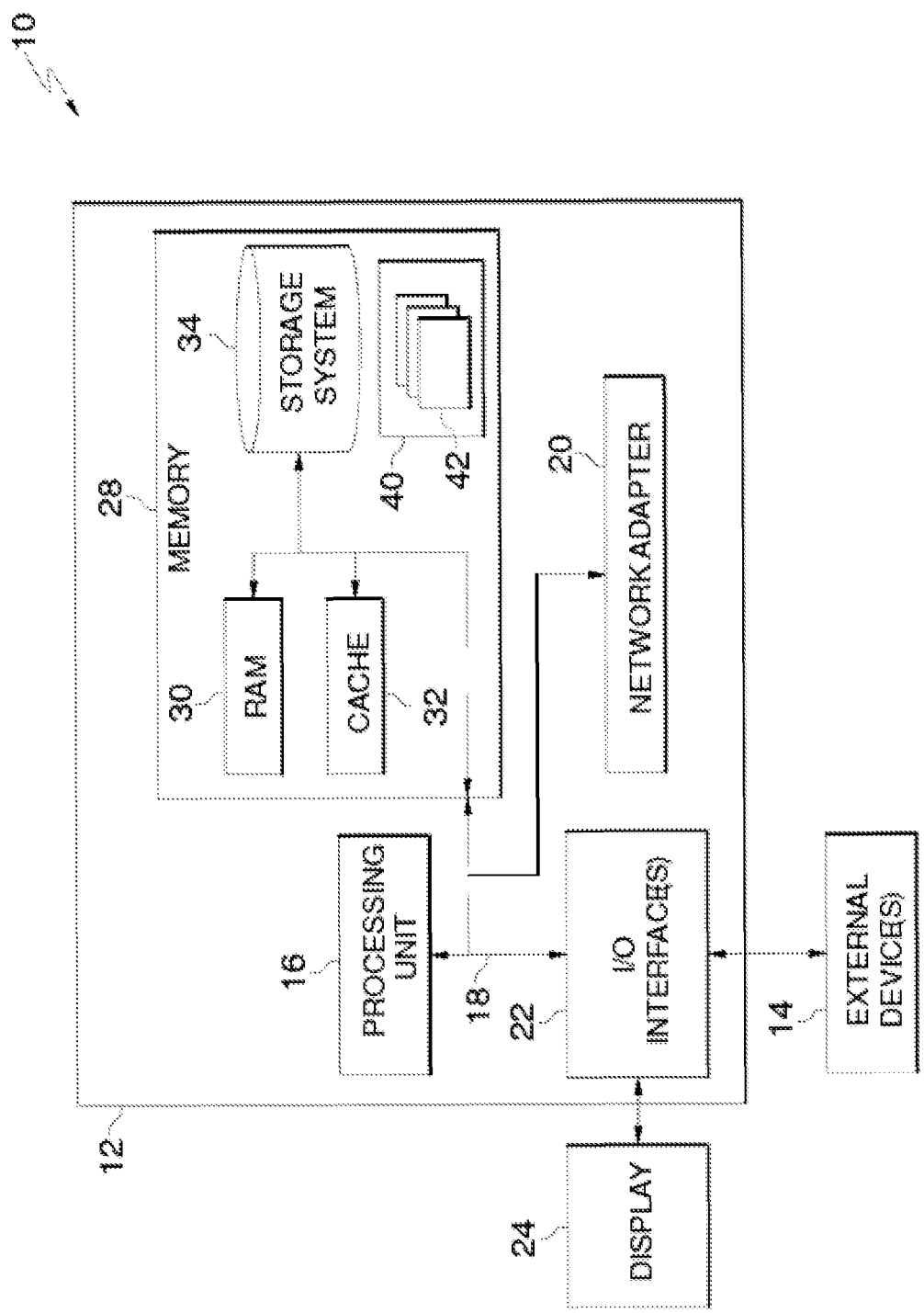
FIG. 2 is a schematic block diagram showing a computing node (10) of FIG. 1, in accordance with one embodiment.

FIG. 2 shows a schematic example of a computing node (10). The computing node (10) is only one example of a suitable computing node and is not intended to suggest any limitation as to the scope of use or functionality of embodiments of the invention described herein. Regardless, the computing node (10) is capable of being implemented and/or performing any of the functionality set forth herein. In the computing node (10) there is a computing device (12). Examples of well-known computing devices include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed computing environments that include any of the above systems or devices, and the like.

The computing device (12) may be described in the general context of computer system executable instructions, such as program modules, being executed by a computer system. Generally, program modules may include routines, programs, objects, components, logic, data structures, and so on that perform particular tasks or implement particular abstract data types. The computing device (12) may be practiced in distributed cloud computing environments where tasks are performed by remote processing devices that are linked through a communications network. In a distributed cloud-computing environment, program modules may be located in both local and remote computer system storage media including memory storage devices.

As shown in FIG. 2, the computing device (12) in the computing node (10) is shown in the form of a general-purpose computing device. The components of the computing device (12) may include, but are not limited to, one or more processors or processing units (16), a system memory (28), and a bus (18) that couples various system components including system memory (28) to the processor (16).

The bus (18) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Peripheral Component Interconnect (PCI) bus, PCI Express bus, InfiniBand bus, HyperTransport bus, and Serial ATA (SATA) bus.

The computing device (12) typically includes a variety of computer system readable media. Such media may be any available media that is accessible by the computing device (12), and it includes both volatile and non-volatile media, and removable and non-removable media.

The system memory (28) can include computer system readable media in the form of volatile memory, such as random access memory (RAM) 30 and/or cache memory 32. The computing device (12) may further include other removable/non-removable, volatile/non-volatile computer system storage media. By way of example only, the storage system (34) can be provided for reading from and writing to a non-removable, non-volatile magnetic medium (not shown and typically called a "hard drive"). Although not shown, a magnetic disk drive for reading from and writing to a removable, non-volatile storage medium (e.g., a "USB flash drive"), and an optical disk drive for reading from or writing to a removable, non-volatile optical disk such as a CD-ROM, DVD-ROM or other optical media can be provided. In such instances, each can be connected to the bus (18) by one or more data media interfaces. As will be further depicted and described below, the memory (28) may include at least one program product having a set (e.g., at least one) of program modules that are configured to carry out the functions of embodiments of the invention.

The program/utility (40), having a set (at least one) of program modules (42), may be stored in the memory (28) by way of example, and not limitation, as well as an operating system, one or more application programs, other program modules, and program data. Each of the operating system, one or more application programs, other program modules, and program data or some combination thereof, may include an implementation of a networking environment. The program modules (42) generally carry out the functions and/or methodologies of embodiments of the invention as described herein. The computing device (12) may also communicate with one or more external devices (14) such as a keyboard, a pointing device, a display 24, etc.; one or more devices that enable a user to interact with the computing device (12); and/or any devices (e.g., network card, modem, etc.) that enable the computing device (12) to communicate with one or more other computing devices. Such communication can occur via Input/Output (I/O) interfaces (22). Still yet, the computing device (12) can communicate with one or more networks such as a local area network (LAN), a general wide area network (WAN), and/or a public network (e.g., the Internet) via the network adapter (20). As depicted, the network adapter (20) communicates with the other components of the computing device (12) via the bus (18). It should be understood that although not shown, other hardware and/or software components could be used in conjunction with computer system/server (12). Examples, include, but are not limited to: microcode, device drivers, redundant processing units, external disk drive arrays, RAID systems, tape drives, and data archival storage systems, etc.

STBs and STB Anonymization

As was described above, some analytics is performed by associating entities with their features and feature elements through the use of STBs. An STB can be thought of, in a general sense, as having a number of dimensions, which each represent a specific feature. The dimensions can be spatial (e.g. a range of longitude values coupled with a range of latitude values; a value in square, cubic, or higher-space-dimensional standard units of measure such as meters; the area of a silicon chip or wafer within a larger substrate; a swath of the sky as photographed by a telescope; a portion of a digitized photograph denoted by a number of pixels per side; etc.), non-spatial (e.g., a radio frequency range; an audio frequency range; a decibel range; a temperature range; a pressure range; a range of percentage values; a volumetric range; a portion of the spectrum of infrared or ultraviolet light; a range of microwave frequencies coupled with a range of distances within which varying types of WiFi or WiMax devices, of varying receiver sensitivity and output power, can connect to the Internet via a service provided by a coffee shop; the set of visible color, audible sound, and distance ranges within which any two South African Cliff Swallows can communicate with each other; etc.), or temporal (e.g., a time interval; a sampling rate; a flow rate; a clock rate; a calendaring function; etc.). An STB can represent a two-dimensional spacetime region (i.e., a surface region and a time interval), a three-dimensional spacetime region (i.e., a space region and a time interval), or really any n-dimensional spacetime region (e.g., the combination of a space region, time interval and a radio frequency range). For ease of explanation, however, an STB will be used in the examples below as reflecting a geospatial region and time interval, at a specific granularity. The "granularity" of the STBs can be configured, for example, by specifying a precision for each dimension of the STB. As will be described in further detail below, the precision for each dimension can be determined, at least in part, by a user, and/or by the "granularity" of the data associated with the entity.

In accordance with the motion processing system of FIG. 1, an analytics engine may be used as a data destination (106) for the system (100) as shown. For ease of use, many analytics engines are oriented toward standardized message format input and output, such as XML (eXtensible Markup Language). For that reason, such engines are also well suited for exact-match comparisons of alphanumeric strings.

The public-domain geohash algorithm can be used to compute alphanumeric strings representing a given geospatial region (see http://en.wikipedia.org/wiki/Geohash). Though this algorithm may perform adequately, it can be insufficient for the temporal representation needed during real-time analysis of geospatial events. Thus, in accordance with one aspect of the invention, improved high-performance time-quantizing techniques are provided that give a flexible approach to time quantization and that enhance the existing public-domain geohash algorithm. Alternatively, a bit vector can be used to represent a geospatial region and/or a time interval. Storing geospatial regions and time intervals as bit vectors can consume less space, and thus can better contribute to scalability, than storing alphanumeric strings. It should be noted, however, that the bit vectors can represent any type of spatial regions, and that they do not necessarily need to be geospatial.

Figure 3:
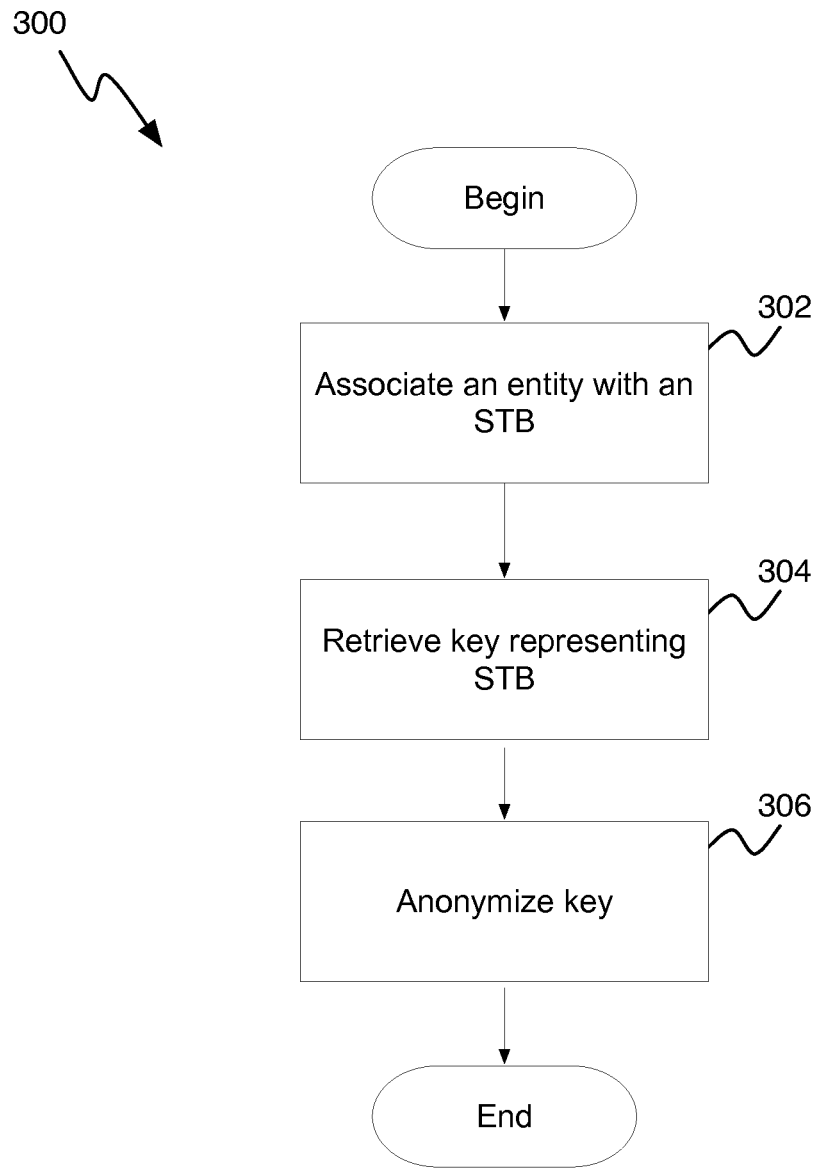
FIG. 3 is a flowchart showing a process for creating an anonymized STB key, in accordance with one embodiment.

In general, routines implemented to calculate STBs can create one or more STBs for a geospatial event by using the geohash public-domain geospatial-quantizing algorithm, along with a simple time-quantizing algorithm. The algorithms' outputs can be programmatically concatenated to form one or more STB keys which can then be anonymized per inventive arrangements as described elsewhere herein. FIG. 3 shows a process in accordance with one embodiment for creating an anonymized STB key for an entity.

As can be seen in FIG. 3, an entity that is observed at a given time is associated with an STB (i.e., a spacetime region), based on the entity's latitude and longitude coordinates and a datetime value (i.e., the spacetime coordinates for the entity) (step 302). Next, the key representing the STB is retrieved (step 304). The keys will be described in further detail below, but in essence a key is an alphanumeric string that represents a spatial area and a time interval that is described by the STB. Thus, two entities that reside in the same STB during the same time interval will have comparable keys. In some embodiments, a user can configure the string length to set a geospatial granularity of STBs. Typically longer strings signify a higher STB granularity. In some embodiments, a user also can configure a single input set of coordinates, corresponding to a single event, to be assigned to multiple STBs of varying geospatial granularity. This will be described in further detail below.

Finally, the key representing the STB is anonymized (step 306), which ends the process. As was discussed above, the anonymization allows an analytics engine to track and store entities' space and time data in a form that safeguards the data from unwanted disclosure while keeping the data recoverable and/or useful for advanced entity resolution, relationship awareness, and insight/relevance detection.

In some embodiments, anonymization can be done through one or more cryptographic algorithms, which may include using secret keys for protection and confidentiality. For example, some embodiments use irreversible cryptographic algorithms (e.g., one-way functions), where the secret key is a "salt" value. Other embodiments use a reversible cryptographic algorithm (e.g., encryption or encoding), where the secret key is the decryption key necessary to reveal the owner of the data record. There are many ways of anonymizing data, and it should be noted that the anonymization of the keys is not limited to the specific examples provided herein. Many variations of anonymization can be envisioned by those of ordinary skill in the art.

The STB functionality described herein enables an analytics engine to accept and respond to STB creation requests in the form of XML message structures. The geospatial data sent into the analytics engine can be extended by an analytics plugin module, or by a standalone executable module, to include the configured STBs for observed spacetime coordinates. These anonymized STB keys then become available for such things as advanced entity resolution, relationship awareness, and insight/relevance detection.

To send geospatial data into the analytics engine, a user can work with a predefined XML message hierarchy for specifying observations, observed entities, entity features, and feature elements. A user can send the analytics engine a set of latitude, longitude, and time values as feature elements within a "GEO LOC" feature. The following is an example of a complete message specifying an observation of an entity that has an associated latitude, longitude, and time.

```
<UMF_DOC>                                                                    Input document tag
    <OBS>                                                                    Observation tag
        <DSRC_CODE>TEST</DSRC_CODE>                                          Data source code for an observation
        <DSRC_ACTION>A</DSRC_ACTION>
        <OBS_SRC_KEY>
            477995071|2010-08-12 15:24:00</OBS_SRC_KEY>
            <SRC_CREATE_DATE>2010-08-12 15:24:00</SRC_CREATE_DATE >
            <OBS_ENT>                                                        Observed entity tag
                <ETYPE_CODE>VESSEL</ETYPE_CODE>                              Entity type code for data describing a ship
                <ENT_SRC_KEY>477995071|2010-08-12 15:24:00</ENT_SRC_KEY>
                <ENT_SRC_DESC>47799507112010-08-12 15:24:00</ENT_SRC_DESC>
                <OBS_FEAT>
                    <FTYPE_CODE>MMSI_NUM</FTYPE_CODE>                        Feature type code for identification data
                    <OBS_FELEM>
                        <FELEM_CODE>ID_NUM</FELEM_CODE>                      Feature element code for identification data
                        <FELEM_VALUE>477995071</FELEM_VALUE>
                    </OBS_FELEM>
                </OBS_FEAT>
                <OBS_FEAT>
                    <FTYPE_CODE>GEO_LOC</FTYPE_CODE>                         Feature type code for geospatial data
                    <OBS_FELEM>
                        <FELEM_CODE>LATITUDE</FELEM_CODE>                    Feature element code for latitude data
                        <FELEM_VALUE>22.28830167</FELEM_VALUE>
                    </OBS_FELEM>
                    <OBS_FELEM>
                        <FELEM_CODE>LONGITUDE</FELEM_CODE>                   Feature element code for longitude data
                        <FELEM_VALUE>114.1584</FELEM_VALUE>
                    </OBS_FELEM>
                    <OBS_FELEM>
                        <FELEM_CODE>TIME</FELEM_CODE>                        Feature element code for datetime data
                        <FELEM_VALUE>1999-12-31 00:00:00</FELEM_VALUE>
                    </OBS_FELEM>
                </OBS_FEAT>
            </OBS_ENT>
    </OBS>
</UMF_DOC>
```

The STB calculator can create multiple STBs and keys in response to a single input geospatial event. The STBs can reflect regions and time intervals at different granularities, all encompassing the event. The following is an example of a complete message representing a set of typical STBs encompassing the event reflected by the latitude, longitude, and time values provided in the sample XML above.

embodiment. The entries in the PLU_STB_MASTER table define STB types and their ranges of geospatial and time interval precisions. A user can specify geospatial precisions as geohash string length values indicating that generated STB keys will include 2-character to 26-character geohash values. A user can specify time interval precisions in units that may include milliseconds, seconds, minutes, hours, days, or years.

```
<EFEAT_RETURN>                                                          Return document tag
    <OBS_FEAT>                                                          Observed feature tag
        <FTYPE_CODE>STB_KEY</FTYPE_CODE>          Feature type code for data describing an STB
        <UTYPE_CODE>PRESENCE</UTYPE_CODE>
        <USED_FROM_DT>1999-12-31</USED_FROM_DT>
        <USED_THRU_DT>2000-01-01</USED_THRU_DT>
        <OBS_FELEM>                                                     Observed feature element
            <FELEM_CODE>EXPRESSION</FELEM_CODE>   Feature element code for an expressed feature
            <FELEM_VALUE>GR1_GH4_1DAY|wecn|1999-12-31</FELEM_VALUE>
        </OBS_FELEM>
    </OBS_FEAT>
    <OBS_FEAT>
        <FTYPE_CODE>STB_KEY</FTYPE_CODE>
        <UTYPE_CODE>PRESENCE</UTYPE_CODE>
        <USED_FROM_DT>1999-12-31 00:00:00</USED_FROM_DT>
        <USED_THRU_DT>1999-12-31 01:00:00</USED_THRU_DT>
        <OBS_FELEM>
            <FELEM_CODE>EXPRESSION</FELEM_CODE>
            <FELEM_VALUE>GR1_GH4_1HOUR|wecn|1999-12-31 00:00:00</FELEM_VALUE>
        </OBS_FELEM>
    </OBS_FEAT>
    <OBS_FEAT>
        <FTYPE_CODE>STB_KEY</FTYPE_CODE>
        <UTYPE_CODE>PRESENCE</UTYPE_CODE>
        <USED_FROM_DT>1999-12-31</USED_FROM_DT>
        <USED_THRU_DT>2000-01-01</USED_THRU_DT>
        <OBS_FELEM>
            <FELEM_CODE>EXPRESSION</FELEM_CODE>
            <FELEM_VALUE>GR1_GH6_1DAY|wecnv9|1999-12-31</FELEM_VALUE>
        </OBS_FELEM>
    </OBS_FEAT>
    <OBS_FEAT>
        <FTYPE_CODE>STB_KEY</FTYPE_CODE>
        <UTYPE_CODE>PRESENCE</UTYPE_CODE>
        <USED_FROM_DT>1999-12-31 00:00:00</USED_FROM_DT>
        <USED_THRU_DT>1999-12-31 01:00:00</USED_THRU_DT>
        <OBS_FELEM>
            <FELEM_CODE>EXPRESSION</FELEM_CODE>
            <FELEM_VALUE>GR1_GH6_1HOUR|wecnv9|1999-12-31 00:00:00</FELEM_VALUE>
        </OBS_FELEM>
    </OBS_FEAT>
</EFEAT_RETURN>
```

In some embodiments, the analytics engine's standard database schema includes two tables used to configure the STB plugin module. These tables represent an STB master list stored in a "PLU_STB_MASTER" table and an STB assignment list stored in a "PLU_STB_ASSIGN" table. Together, these tables determine the set of STBs the plugin module will create for a given geospatial event.

In some embodiments, the PLU_STB_MASTER table contains fields with the following names, for the purpose of establishing a set of spacetime granularities for use with the plugin module.
  i. STB_NAME
  ii. STB_GRID_ID
  iii. STB_SPACE_ORD
  iv. STB_TIME_ORD
  v. SPACE_FUNC
  vi. SPACE_PARMS
  vii. TIME_FUNC
  viii. TIME_PARMS The PLU_STB_MASTER table defines the entire set of possible STB types that the analytics engine can track and compare using the plugin module, in accordance with one embodiment. The entries in the PLU_STB_MASTER table define STB types and their ranges of geospatial and time interval precisions. A user can specify geospatial precisions as geohash string length values indicating that generated STB keys will include 2-character to 26-character geohash values. A user can specify time interval precisions in units that may include milliseconds, seconds, minutes, hours, days, or years. A user also can specify a positive integer value ahead of the time unit specifier, to generate STBs whose time interval boundaries fall on multiples of that number in those units. The entries in the PLU_STB_MASTER table can be described in further detail as follows.

STB_NAME—SpaceTimeBox name: An identifier for an STB type. Typically the master list is populated with descriptive identifiers. For example, an identifier such as "GR1_GH6_1HOUR" depicts an STB type in grid one whose geospatial precision is a geohash value of six characters and whose time interval precision is one hour. Any events assigned to such an STB will be the same to other events occurring in the same six-character geohash region during the same hour. The actual names can be arbitrary, but in order to improve human readability, it may be advantageous in some embodiments to use names that describe the granularity.

STB_GRID_ID—SpaceTimeBox grid id: An identifier for a grid. Although a single grid will be most common, various embodiments can support an indefinite number of grids. The grids can be overlapping, competing, or altogether unrelated.

STB_SPACE_ORD—SpaceTimeBox geospatial ordinal: A descriptor for STB types that can be used to perform geospatial ordering. In some embodiments, all master table entries that have the same number of geohash characters have the same geospatial ordinal value.

STB_TIME_ORD—SpaceTimeBox time ordinal: A descriptor for STB types that can be used to perform temporal ordering. In some embodiments, all master table entries of the same time interval precision have the same time ordinal value.

SPACE_FUNC—Geospatial range-defining function: A name of the function used to generate STB geospatial regions that can be compared. In one embodiment a "GEOHASHER" function generates alphanumeric strings using the public-domain geohash algorithm, but as the skilled reader realizes, other space generalization functions also can be used.

SPACE_PARMS—Geospatial range-defining parameters: A comma-separated list defining the actual geohash precision, along with filtering parameters, associated with any STB assigned to the master list entry.

TIME_FUNC—Time interval-defining function: A function used to generate STB time intervals that can be compared. In one embodiment a "TIMEBOXER" function generates datetime intervals whose "lower" and "upper" boundaries are denoted in the form yyyy-mm-dd hh:mm:ss:uuu. The TIMEBOXER function elides low-order fields for time intervals of day-or-longer duration and elides microsecond fields unless these are specifically called for by the TIME PARMS value. However, it should be noted that this is merely an example and that other functions also can be used.

TIME_PARMS—Time interval-defining parameters: A comma-separated list defining the actual time interval precision, along with filtering parameters, associated with any STB assigned to the master list entry. In one embodiment, allowable unit-specifying strings include EVER, YEAR, MONTH, DAY, HOUR, MIN, SEC, and MS. Any time is comparable to an STB whose time unit is EVER.

In some embodiments, the PLU_STB_ASSIGN contains fields with the following names, for the purpose of associating input geospatial events with a subset of the possible STB types defined by the PLU_STB_MASTER table:

i. DSRC_CODE
ii. ETYPE_CODE
iii. STB_NAME
iv. OUT_FTYPE_CODE
v. OUT_UTYPE_CODE
vi. XPATH_FILTER For each incoming event, that is, observation of an entity at a given location and time, the STB plugin module creates a set of STBs, typically one for each assignment in the assignment list. The STB assignment list entries designate the set of STB types to be associated with a qualifying event. For each event, the STB plugin module returns a set of assigned STBs according to the assignment list. The plugin module creates an STB for each assignment where the input XML has both DSRC_CODE and ETYPE_CODE values that match the values in an assignment list entry and where XPATH_FILTER either is empty or designates an applicable condition that is met.

DSRC_CODE—Data source code: An identifier that corresponds to an entry in a "CFG_DSRC" table and that indicates the data source for which an STB may be created. Given an input geospatial event, the plugin module generates only those STBs for which an assignment's DSRC_CODE value matches a corresponding value in the input XML document representing the event.

ETYPE_CODE—Entity type code: An identifier that corresponds to an entry in a "CFG_ETYPE" table and that indicates an entity type for which an STB may be created. Given an input geospatial event, the plugin module generates only those STBs for which an assignment's ETYPE_CODE value matches a corresponding value in the input XML document representing the event.

STB_NAME—SpaceTimeBox name: An identifier for an STB type defined in the master list. Given an input geospatial event, the plugin module can generate a set of STBs that each has unique STB types, each describing an STB at a different spacetime granularity. All of the STBs that are returned will include the given event.

OUT_FTYPE_CODE—Output feature type code: A feature type code that corresponds to an entry in a "CFG_FTYPE" table. This field designates the type of expressed (programmatically generated) feature associated with any STB assignment that is based on the assignment list entry. Its default value is STB_KEY.

OUT_UTYPE_CODE—Output usage type code: A usage type code that corresponds to an entry in a "CFG_UTYPE" table. This field designates a usage type associated with any STB assignment rather than is based on the assignment list entry.

XPATH_FILTER—Filtering string with XPath syntax: A character string describing a filter. The plugin module applies the filtering logic to the input XML document and accepts any filter whose syntax is in accordance with the XPath (XML Path Language) specification. In some embodiments, if this field is left empty, then no filtering is applied. Otherwise, if this field contains a valid XPath expression that evaluates to "True" for a given event, then the event is assigned to an STB of the type designated in the STB_NAME field. That assignment is then included in the resulting set of STBs generated for the event. If the XPath expression evaluates to "False" for a given event, then the designated assignment is not included in that resulting set of STBs.

Working with Non-Geospatial SpaceTime Data Using Custom Plugin Code

The analytics engine's standard STB construct can represent a geospatial event e.g., latitude, longitude, and time. In some embodiments, a user familiar with programming can add support for other STB types by creating custom plugin modules for the analytics engine. A plugin module exports certain predefined functions callable by the analytics engine at runtime, including a function used to generate expressed features, such as STBs.

Standalone SpaceTimeBox Calculator

It should be noted that there is no need to run an analytics engine to generate STB data for a set of spacetime coordinates. In some embodiments, a user can opt to generate this data using an executable module that can be provided as part of an installed analytics engine file set or separately. The term "executable module" as used herein refers to a typical software application, or applet, e.g. for Windows, Linux, or Solaris, implementable in native, Java, or managed code, or as a script, which can run entirely on its own and produce STB data for any purpose whatsoever. Using this executable module, a user can create and work with STBs during pre-processing of the same space and time data that the analytics engine uses. This executable module can be invoked with command-line-style options indicating an input file, an output file, and a path to text files containing STB master list and assignment list entries.

As was described above, the various embodiments allow each datetime value to be represented as an array of unsigned integers (rather than as milliseconds from an arbitrary datetime coordinate) for use in STBs. By avoiding conversions between human-readable and machine-readable data, any application relying on spacetime quantization can achieve high performance.

SpaceTimeBox Sliders, Fuzzy Geospatial/Temporal Quantization, and Filtering of Coordinates in Configurable Areas As was described above, in some embodiments incoming data about events consists of records in an XML format describing spacetime coordinates e.g., latitude, longitude, and datetime values. In some embodiments, additional input data can include feature elements describing the precision of the input spacetime coordinates. An inbound record for the analytics engine can include both geospatial and temporal precision values and can take a form such as:

i. LATITUDE
ii. LONGITUDE
iii. GEO_PRECISION
iv. DATETIME
v. TIME_PRECISION

The GEO_PRECISION value can be specified in unsigned integer values representing meters. For example, in some embodiments this number may represent 20 meters, 60 meters, 240 meters, etc. If this field is blank, or not specified in the incoming XML, it will be treated as 0 which would indicate 0 meters of error.

The TIME_PRECISION value can represent the precision, in seconds, of a datetime stamp. Typically this will be zero as provided by most data source systems. In some embodiments, it can be routinely set to, for example, 0.1 (i.e., 100 milliseconds) to accommodate for possible errors.

The GEO_PRECISION and TIME_PRECISION feature elements can be used for various purposes. One purpose involves using one or more of the GEO_PRECISION and TIME_PRECISION values as qualification criteria to filter input data of insufficient precision. For example, if the geohash length is 6 bytes (i.e., a 610 m precision) then a filter can be set to include only those geolocation records having a precision less than or equal to 100 m. On the other hand, if the geohash length is 8 bytes (i.e., a 91 m precision), then a filter can be set to include only those geolocation records having a precision less than 20 meters. This limits the generated STBs to those that are of reasonable granularity for the precision and prevents a +/−2000-meter latitude/longitude precision from being assigned to a 19-meter box, for example.

A second purpose for precision feature elements is to implement a concept referred to herein as "sliders". That is, a configuration setting can be set either system-wide or by entity type or data source, as a threshold percentage beyond which additional STBs are generated to represent an event. When the input data's precision indicates that an event may fall in one or more adjacent eligible STBs, the STB calculator can be configured to include those adjacent STBs (of the same space or time granularity) among the set of STBs returned by the STB calculator. To configure this inheritance of neighboring STBs based on precision, a user can set values known as slider thresholds.

Further, spacetime coordinates can be filtered based on configurable geospatial areas. If coordinates fall into specified geohashes, or into roughly elliptical areas around configurable latitudes and longitudes, the STB calculator can include or exclude them based on these settings (and thus either produce or not produce the resulting STBs). In order to achieve this functionality, in some embodiments the following configuration settings are provided for STB generation:

INCLUDE_IF_GEO_PRECISION—Qualifying geospatial precision, in meters: A numeric value representing a geospatial precision, in meters, beyond which no STBs qualify for assignment. Incoming geospatial data may be associated with precisions specified either by data source or by observation. If an event's precision value is greater than or equal to the GEO_PRECISION value, then the event is not assigned to an STB of the type identified in the STB_NAME field. But if the observed precision value is less than the GEO_PRECISION value, the designated assignment may be included in the resulting set of STBs. For example, if GEO_PRECISION is set to 200 and the event has a precision of 2000, an STB is not generated.

INCLUDE_IF_GEOHASH_LIST—List of geohash strings that qualify for assignment: A comma-separated list of strings representing geospatial regions qualifying for STB assignment. If the list is populated and the geohash string associated with an event matches a string in the list, then the event may be assigned to an STB of the type identified in the STB_NAME field. Otherwise, the designated assignment is not included in the resulting set of STBs.

INCLUDE_IF_NEAR_LAT—Latitude of eligibility zone center point: A decimal number representing a latitude value. This value can be set to define the latitude of the center of a roughly elliptical zone of eligibility. If an event is observed in the zone, then the event may be assigned to an STB of the type designated in the STB_NAME field. Otherwise, the designated assignment is not included in the resulting set of STBs.

INCLUDE_IF_NEAR_LONG—Longitude of eligibility zone center point: A decimal number representing a longitude value. This value can be set to define the longitude of the center of a roughly elliptical zone of eligibility. If an event is observed in the zone, then it may be assigned to an STB of the type designated in the STB_NAME field. Otherwise, the designated assignment is not included in the resulting set of STBs.

INCLUDE_IF_WITHIN_METERS—Radius of eligibility zone, in meters: A numeric value representing the radius of the zone of eligibility centered at the coordinates configured via the INCLUDE_IF_NEAR_LAT and INCLUDE_IF_NEAR_LONG fields. All three of these fields must be set, in order for an eligibility zone to be effectively configured. If an event is observed in the zone, then it may be assigned to an STB of the type designated in the STB_NAME field. Otherwise, the designated assignment is not included in the resulting set of STBs.

GEO_SLIDER_THRESHOLD_PERCENT—Percentage of geographical error for inclusion of adjacent STBs: A numeric value representing a percentage of error beyond which, based on the input GEO_PRECISION value, the STB calculator can generate adjacent STBs that may contain the event. If this field is empty, or if no GEO_PRECISION value is associated with the event, then no surrounding STBs are included in the result set. Otherwise, the STB calculator multiplies the GEO_PRECISION value associated with the event by this percentage value to determine an area over which STBs that are adjacent in space, and that within the percentage of error may contain the event, can be included.

FIG. 4 shows a schematic example of a situation where an observation's GEO_PRECISION is 120 meters and the GEO_SLIDER_THRESHOLD_PERCENT value has been set to 50. The STB calculator multiplies these values (taking 50% of 120 meters, or 60 meters, in this example) and determines whether any adjacent STBs intersect an area of a 60-meter radius around the event. Any STBs intersecting that area are eligible for equal inclusion. More specifically, the STB calculator checks for STBs that might contain the event, based on the observation's precision, by covering a roughly circular area that has a 60-meter radius, centered at the observation's latitude and longitude. The STB calculator includes in the result set any STBs totally or partially situated in that area. In this way, the STB calculator can generate STBs adjacent to, and of the same granularity as, the STB that contains the event nominally, based on the event's given coordinates and their given precision, subject to any configured GEO_PRECISION, GEOHASH_LIST, and XPATH_FILTER settings that can eliminate some or all of these results.

FIG. 5 shows a schematic example of another embodiment of the situation described above with respect to FIG. 4. Also here, the GEO_PRECISION is 120 meters and the GEO_SLIDER_THRESHOLD_PERCENT value has been set to 50, but instead of creating a circle of inclusion, as described above, the STB calculator chooses four sample points located north, east, south, and west of the event's nominal location. Each of these four points is located at a distance from that nominal location of GEO_PRECISION multiplied by GEO_SLIDER_THRESHOLD_PERCENT, in the same units of measure as the GEO_PRECISION (i.e. meters). The STB calculator includes in the result set any STBs that include a sample point. Thus, just as in the embodiment described with respect to FIG. 4, the STB calculator can generate STBs adjacent to, and of the same granularity as, the STB that contains the event nominally, based on the event's given coordinates and their given precision, subject to any configured GEO_PRECISION, GEOHASH_LIST, and XPATH_FILTER settings that can eliminate some or all of these results.

The GEO_SLIDER_THRESHOLD_PERCENT value can allow for a reduced accounting of the potential precision (error), such as 25%. In the above examples, if the configured percentage is 25, then the STB calculator checks for adjacent STBs whose borders nearest to the event come within (or have sample points within) an area of a 30-meter radius (i.e., 25% of 120 m) around the event's coordinates. The STB calculator can then include those STBs in the result set.

The GEO_SLIDER_THRESHOLD_PERCENT value also can be greater than 100%. In the above example, if the GEO_SLIDER_THRESHOLD_PERCENT value is 105, then the STB calculator checks for adjacent STBs whose nearest borders are (or that include sample points) out to 126 meters around the event's coordinates. The STB calculator can then include those STBs in the result set.

TIME_SLIDER_THRESHOLD_PERCENT—Percentage of temporal error for inclusion of adjacent STBs: A numeric value representing a percentage of error beyond which, based on the input TIME_PRECISION value, the STB calculator can generate adjacent STBs that may contain the event. If this field is empty, or if no TIME_PRECISION value is set, then no surrounding STBs are included in the result set. Otherwise, the STB calculator multiplies the TIME_PRECISION value associated with the event by this percentage value to determine a time interval over which STBs that are adjacent in time, and that within the percentage of error may contain the event, can be included.

Time can be treated similarly to space. In the above example, if an event's TIME_PRECISION value is 1 second, then the STB calculator checks the time 1 second before and 1 second after the event. It can generate adjacent (in time) STBs, if they are totally or partially included in the resulting time interval, subject to any configured GEO_PRECISION, GEOHASH_LIST, and XPATH_FILTER values. If the TIME_SLIDER_THRESHOLD_PERCENT value is 50, in this example, then the STB calculator checks only the time interval out to half second before and after the event, for adjacent (in time) STBs that it can generate.

In some embodiments, a routine can determine whether a given datetime value is sufficiently "close to" a time interval boundary for a neighboring time interval to qualify for inclusion in the resulting set of STBs.

In some embodiments, a routine can be used in sliders computation to generalize the base of the time range used for "lower bound" sliders computation by representing that time as a set of numeric values that can represent one or more of: a year, a month, a day, an hour, a minute, a second, and a millisecond. Performing this computation without converting datetime values to offsets (in milliseconds or otherwise) from an arbitrary datetime, allows for higher performance than could otherwise have been achieved.

Using Spacetime Quantization and Discrete Entity Counters for High-Speed Candidate Selection In some embodiments, the analytics engine can resolve inbound entities with existing entities through a process that starts with candidate selection by identifying spacetime co-occurrence (i.e., whether two entities are associated with the same STB) between candidate entities using their anonymized STB keys. As described above, when an entity, such as a ship, is associated with an STB feature, other entities can be compared with it and be exactly matched (or not) to that entity's geospatial location at a certain time, at the granularity defined by the STB. If an observed entity is found to be sufficiently similar to a candidate entity—i.e. a candidate vessel shares sufficient features with the observed ship—then the analytics engine can resolve the observed entity and the candidate entity by considering them to be one and the same entity.

As a single STB may contain zero, few, or many previously observed entities, it may be worthwhile to count, in real time, the number of discrete (unique) entities that share the same STB. The combination of discrete entity counting and configurable real-time assignment to STB keys by granularity makes candidate section for new entities fast and efficient. In some embodiments, this works as follows:

1. Space and time can be generalized and anonymized by breaking it down into STBs represented as features with specific anonymized STB keys. The analytics engine can compare among other features anonymized STB keys to determine whether two entities are the same (because they have corresponding keys) or different (because they do not have corresponding keys). That is, any entities that are associated with STB features can be differentiated by their STB keys. Entities that share STB keys can be resolved into a single entity, based on STB co-location and other features of those entities. Entities that have disagreeing anonymized STB keys (e.g., cannot be in two places as the same time) can be automatically prevented from resolving into a single entity.

Figure 6:
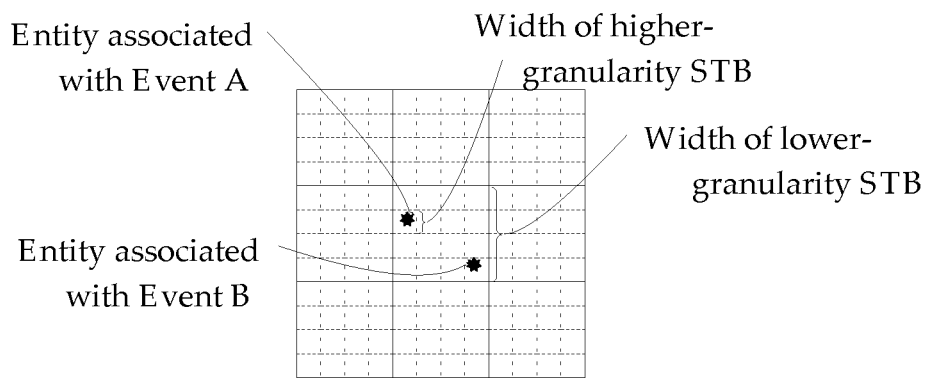
FIG. 6 is a schematic view showing STBs of different granularities, in accordance with one embodiment.

2. Entities can be associated with different STB granularities, and accordingly STB keys of varying length can be computed, stored and compared, based on data source precision and user-configurable settings. FIG. 6 shows a schematic view of how two entities, Entity A and Entity B, respectively, are associated with different STB granularities. As can be seen in FIG. 6, both Entity A and Entity B reside in the same lower-granularity STB (i.e., if they are geospatial entities that are assigned respective non-anonymized geohash keys, these keys may be identical up to a point), but they reside in different higher-granularity STBs (i.e., the last portion of their respective geohash keys differ).

3. Sets of entities (e.g. swaths of space and time selectable by coordinates and radii, or by XPath filtering, or by other means of geospatial inclusion and/or exclusion) can be selected through anonymized STB keys according to a range of user-configurable settings, to enhance both performance and scalability of candidate selection.

4. Entities that are candidates for resolution, based on STB-related evaluation, can be selected according to the overall number of entities that are generally observed in the vicinity. For example, an STB that covers a twenty-kilometer area may cover a metropolitan setting, or it may cover a setting in the open ocean. On the one hand, thousands of entities may be distinguished in the metropolitan setting, where an attempt to consider so many candidate entities would not scale for candidate selection purposes. On the other hand, only a few entities (e.g. vessels) may be distinguished in the ocean setting, where the relatively small number of entities sharing the same STB would qualify them all as candidates for prospective resolution—at scale.

5. In some embodiments the analytics engine counts entities' features once per discrete entity. Entities that are observed on multiple occasions in an STB are counted, as having been observed in that STB, just once. This optimization allows for large numbers of similar observations to be reduced to a relatively few representations of single occurrences that each reflect a specific tracked entity. Further, this optimization is applicable to any entity feature, including the STB feature, providing for significant entity resolution scalability.

The foregoing set of space and time capabilities can be applied to both anonymized keys and to keys which are not anonymized, and can lead to scalable, privacy-protective, highly practical resolution of entities based on geospatial data coming in from a range of data sources.

Hangout Detection

In some embodiments, motion processing functionality can be used to detect and report "hangouts," that is, conditions where an entity is observed in a certain set of STBs on at least a certain number of occasions over a certain time interval. In some embodiments, hangout detection can be available through a standalone executable that provides data for processing by an analytics engine, or for any other purpose. In some embodiments, hangout detection can be available through a component of the analytics engine itself.

The hangout detector executable or component monitors the movement of entities, flagging conditions where an entity is observed "hanging out" in one or more STBs. The data sources, entity types, and spatial areas covered by hangout detection are all configurable. In some embodiments, the hangout detector uses in-memory event tracking to detect hangouts with optimum efficiency.

In some embodiments, the hangout detector's in-memory event data is not shared across processes. Therefore, incoming motion data for a particular entity is consistently passed to a particular hangout detector node tracking that entity. In one embodiment, a simple scheme involves always passing the same Observation Source Key (OBS_SRC_KEY) value to the same motion-processing node. In deploying the hangout detector, a user can implement this through a simple modulo function.

In some embodiments, the hangout detector's in-memory event data is volatile. That is, whenever the hangout detector is exited and restarted, any work-in-progress hangouts are lost. This means stopping and re-starting the process may cause the system to miss reporting real hangouts. To remedy this, some of the motion data history can be replayed, e.g., going back in time 48 hours and replaying those motion records applicable to any node that was restarted.

Hangouts can be detected based on configurable time windows, or time horizons, whose durations have practical limits based on the number of entities and events that are tracked. Events expire as time moves on past those time horizons, and the memory used for tracking expired events is reclaimed. If a user needs to set up horizons of very different durations, a user can assign tasks to multiple hangout detector processes for scalability. One process might work on minute-based motion data to produce daily hangout records. These records could then be treated as events streamed to another process that might compute hangouts on hangouts, i.e., daily hangouts treated as motion data to roll up to weekly or monthly hangouts.

A configuration table or file (for example, in the form of comma-separated values, .csv) can be used to configure what is defined as a "hangout". The configurable parameters can include a qualifying time interval and minimum number of events for any given data source, entity type, and STB. When these thresholds are met, the hangout detector produces a hangout record (an XML structure) for the entity.

In some embodiments, a hangout detector executable module can be configured by a file containing the following comma-separated fields:
  i. DSRC_CODE
  ii. ETYPE_CODE
  iii. STB_KEY
  iv. QUAL_DUR
  v. QUAL_DUR_UOM
  vi. MIN_EVENTS In one embodiment, STB hangout configuration associates data sources, entity types and STBs with time and event thresholds as follows:

DSRC_CODE—Data source code: An identifier that corresponds to an entry in a "CFG_DSRC" table and that indicates the data source for motion data. The value in this field can represent any code designating the data source, e.g., "AIS".

ETYPE_CODE—Entity type code: An identifier that corresponds to an entry in a "CFG_ETYPE" table and that indicates an entity type. The value in this field can represent any code designating the entity type, e.g., "VESSEL".

STB_KEY—SpaceTimeBox key: An identifier for an STB type representing a value in the PLU_STB_MASTER configuration table or in some other source of STB configuration settings, e.g., "GR1_GH6_1HOUR".

QUAL_DUR—Qualifying duration: A numeric value representing a time horizon, the maximum qualifying time interval in which a hangout becomes time-qualified; a hangout must also qualify based on the number of events specified in the MIN_EVENTS field.

QUAL_DUR_UOM—Qualifying duration units of measure: An identifier for the units of measure applicable to the QUAL_DUR value. Acceptable identifiers can include, for example, YEAR, MONTH, DAY, HOUR, MIN, SEC, and MS.

MIN_EVENTS—Minimum qualifying events: A numeric value representing the minimum qualifying number of events that must be observed before the hangout becomes qualified; a hangout must also qualify based on the time horizon specified in the QUAL_DUR and QUAL_DUR_UOM fields.

In some embodiments, the XML message format that was shown above with reference to the STBs can also be used by the hangout detector to generalize a geospatial event. Furthermore, hangout STB's can be anonymized in just the manner a stationary spacetime coordinates STB can be standardized.

In some embodiments, for each observed entity, the hangout detector tracks events associated with STB keys in the hangout configuration table or file. The hangout detector considers any event accumulation (not qualified as a hangout) that has exceeded the configured time horizon to be expired. The hangout detector will generate no hangout record once the relevant events have expired. Instead, it deallocates the memory for those accumulated events.

Figure 7:
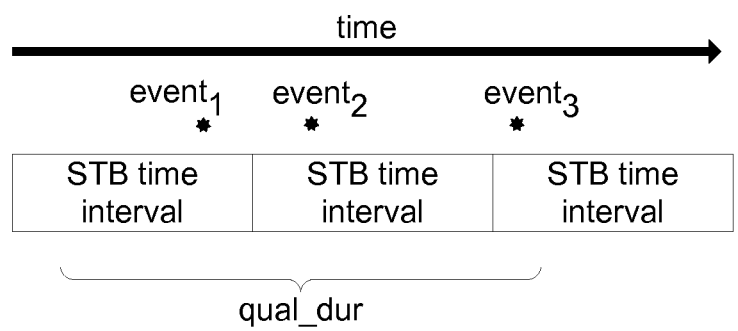
FIG. 7 is a schematic view of how events expire at hangout interval boundaries, in accordance with one embodiment.

In one embodiment, based on an option designated "-EXPIRE_EVENTS_BY_STB_INTERVAL", the hangout detector can alternatively track events associated with complete STB information. It can then consider any event older than either the configured time horizon or the limit of the STB time interval to be expired. It also can deallocate event records that have expired based on either the configured time horizon or the STB interval, if the -EXPIRE_EVENTS_BY_STB_INTERVAL option is set. FIG. 7 shows a schematic view of how events expire at hangout interval boundaries. All three events shown in FIG. 7 qualify as meeting threshold requirements, and a hangout is flagged if MIN_EVENTS is set to 3.

In an embodiment where events expire at STB time interval boundaries, those events that are not in a common STB do not contribute to hangout reporting for that STB, and a hangout is flagged in the above scenario only if MIN_EVENTS is set to 1 or 0. It is envisioned that the hangout detector's scalability and performance will be somewhat reduced in such an embodiment.

Figure 8:
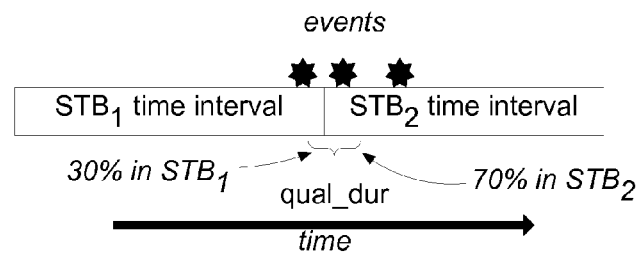
FIG. 8 is a schematic view of how hangouts are detected in accordance with a user-supplied Qualifying Timebox Percentage, in accordance with one embodiment.

FIG. 8 shows one embodiment in which a user can set a Qualifying Timebox Percentage (QUAL_TIMEBOX_PERCENT) to define when a hangout should be detected. In FIG. 8, an entity spends 30% of its time in STB1 and 70% of its time in STB2. If a user has set QUAL_TIMEBOX_PERCENT to 50%, a hangout is flagged in STB2. If the user instead had set QUAL_TIMEBOX_PERCENT to 30% or less, a hangout would be flagged both in STB1 and STB2.

In some embodiments, a hangout is immediately flagged when a qualifying number of events occurs within a qualifying timeframe. Further events occurring within the same STB do not result in further hangout reports. That is, hangout reports are limited to no more than one per entity per STB, thus making the hangout detection much more efficient than otherwise would be the case.

Figure 9:
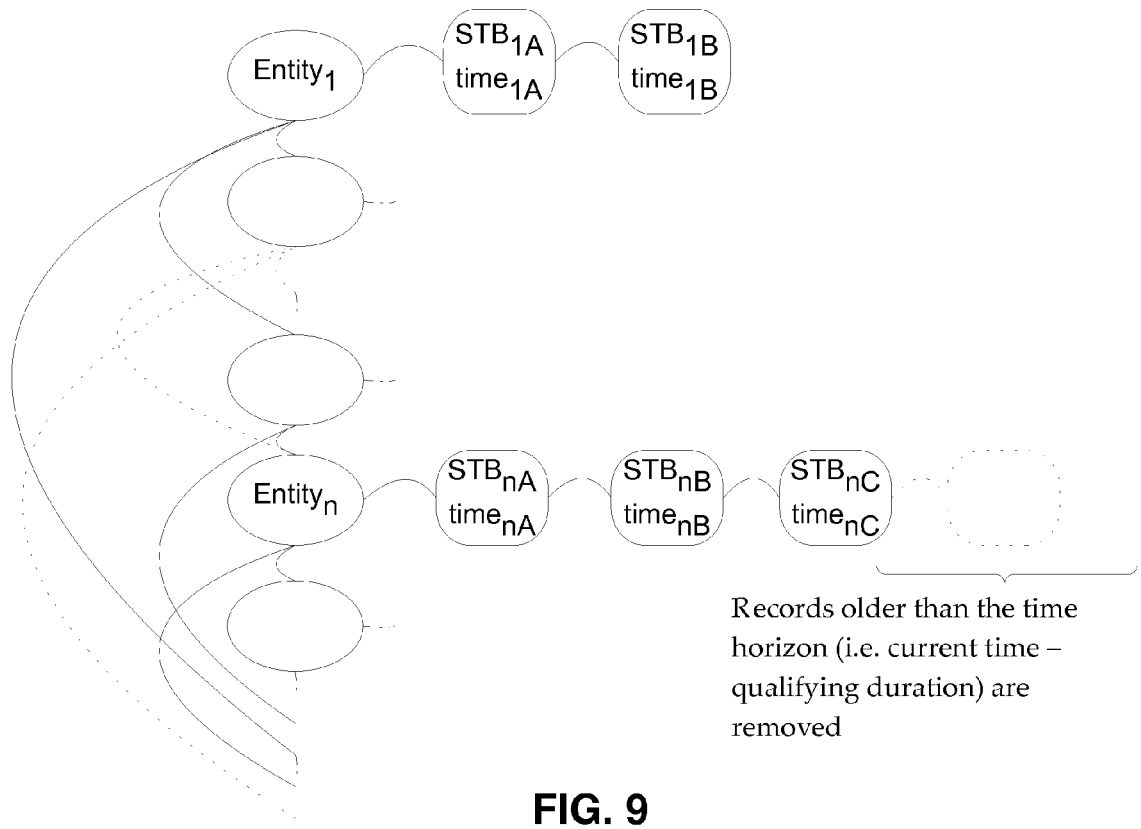
FIG. 9 is a schematic illustration of an entity tracking skiplist, in accordance with one embodiment.

In some embodiments, for rapid entity and event lookup, the hangout detector tracks entities in a skiplist sorted by numeric entity keys. The events associated with each tracked entity are recorded in FIFO queues, one queue per tracked entity. A queue cleanup thread routinely walks the entity list and event queues, deallocating the tracking structures associated with any events older than the qualifying duration. The queue cleanup thread also deallocates the tracking structures associated with any entities whose event queues have become entirely empty. This is schematically shown in FIG. 9. A more detailed discussion of this embodiment will now be described with respect to FIGS. 10 and 11, which show two flowcharts representing the processing steps for the threads of the multithread hangout detector, in accordance with one embodiment.

Figure 10:
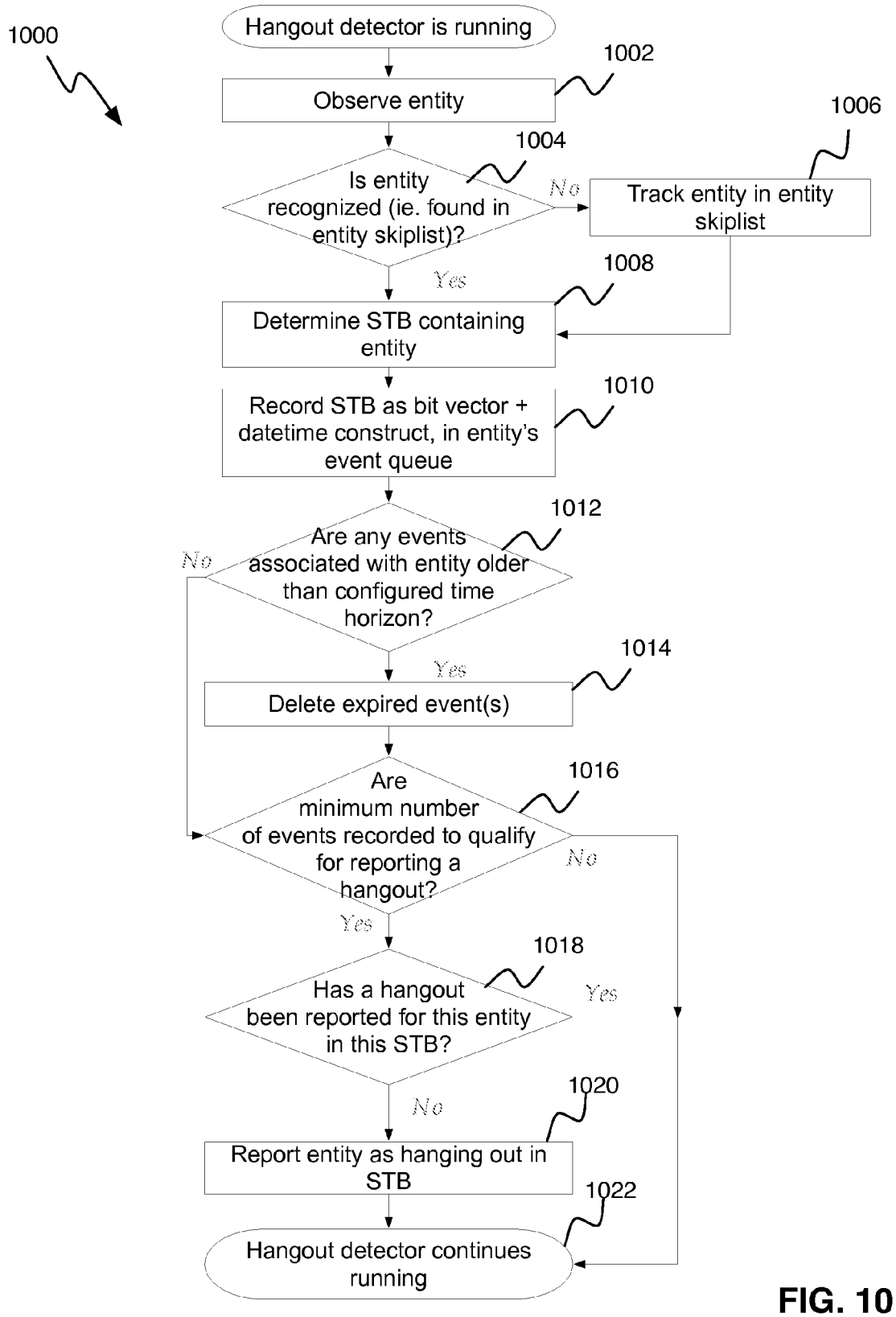
FIG. 10 is a flowchart showing the operation of a first thread in a multi-threaded hangout detector in accordance with one embodiment.
Figure 11:
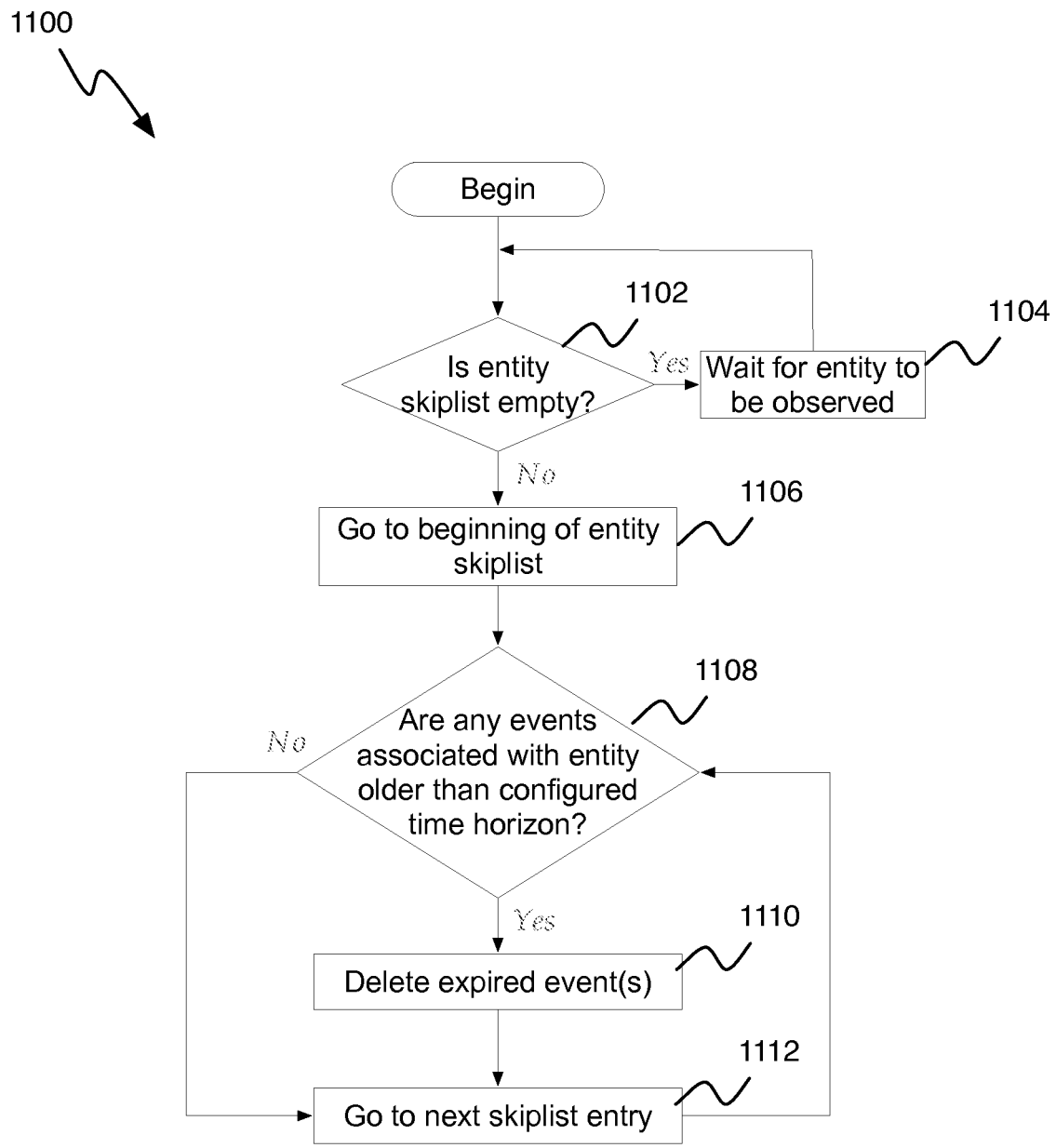
FIG. 11 is a flowchart showing the operation of a second thread in a multi-threaded hangout detector in accordance with one embodiment Like reference symbols in the various drawings indicate like elements.

FIG. 10 shows the operation of a first thread and FIG. 11 shows the operation of a second thread. As can be seen in FIG. 10, the thread starts by observing an entity (step 1002). The thread then checks if the entity is recognized (that is, found in the entity skiplist) (step 1004). If the entity is not found in the entity skiplist, the thread continues to step 1006 where the entity is tracked the skiplist. When the entity is tracked in the entity skiplist, either as a result of a positive determination in step 1004, or as a result of starting to track the entity in the entity skiplist in step 1006, the thread goes on to determine the STB containing the entity (step 1008). Next, the STB is recorded as a bit vector and date time construct in the entity's event queue (step 1010). The thread then examines whether there are any events that are associated with entity and that are older than the configured time horizon (step 1012). If there are such events, these expired events are deleted (step 1014). If there are no such events, or when the older events have been deleted, the thread continues to step 1016, in which it checks whether a minimum number of events are recorded to qualify for reporting a hangout. If no such minimum number of events has been recorded, the hangout detector continues running (step 1022) so as to enable the thread to process any further observations. If a minimum number of events has been recorded, the thread goes on to determine whether a hangout has been reported for the entity and STB (step 1018). If a hangout has been reported, the hangout detector keeps running (step 1022) in expectation of further observations. If a hangout has not been reported for the entity and STB, the thread continues to step 1020 in which it reports the entity as hanging out in the STB (step 1020), and the hangout detector continues running (step 1022), which concludes the description of the first thread.

In parallel with the first thread, a second thread is run, as shown in FIG. 11. As can be seen in FIG. 11, this second thread determines whether the entity skiplist is empty (step 1102). If the entity skiplist is empty, the thread waits for an entity to be observed (step 1104). If it is determined that the skiplist is not empty in step 1102, the thread goes to the beginning of the entity skiplist (step 1106) and determines whether there are any events that are associated with the entity and that are older than the configured time horizon (step 1108). If there are such events, then these expired events are deleted (step 1110) and the thread proceeds to the next entry in the skiplist (step 1112). If there are no events in step 1108 that are associated with the entity and that are older than the configured time horizon, the thread proceeds to the next entry in the skiplist (step 1112), which concludes the description of the second thread. Note that the next skiplist entry can include the first entry, which becomes the next entry when the thread has reached the end of the skiplist.

In some embodiments, when the hangout detector flags a detected condition to the analytics engine, it does so by passing data about the anonymized hangout into the analytics engine. The XML data describes an observed feature, with a feature type code of STB_KEY and a usage type code of HANGOUT. The XML data includes a feature element whose code is EXPRESSION and whose value is the STB key corresponding to the region in which the detected hangout has occurred.

CONCLUDING COMMENTS

In performing privacy-enhanced entity tracking described herein a user can arrange for observed entities to be associated with 0-n anonymized STB keys, and for the methods described herein to be performed, by any of several processing nodes. For example, one computer can process all incoming records, then farm out individual tasks to one of N other computers (that is, N processing nodes). Based on a numeric entity or observation identifier, a decision can be made as to which node among the N nodes will process a given task. In some embodiments, this decision can be as simple as taking the input identifier modulo N.

While the above embodiments have been described with reference to XML, which is rapidly becoming a standard for tagged data transfer between applications and/or components, it is noted that there are also several other standardized message formats or forms in which output can be provided. For example, one alternative is tagless storage, such as in-memory data structures that are agreed on between applications or components and shared through means such as named pipes, shared memory, queues, on-disk files, and so on. Another alternative involves writing data to a database (using SQL encodings, for example) and reading the data back into other applications or components. Yet another alternative involves writing a custom data transfer protocol. As can be seen, many variations of data exchange mechanisms can be envisioned by those having ordinary skill in the art.

Further, it should be noted that while the majority of the above embodiments have been described with respect to spatial dimensions describing geospatial regions, such as longitude and latitude coordinates, the same techniques can be applied to non-spatial dimensions that describe the geospatial region, such as geographical areas that are covered by a specific cell phone tower, for example, or geographical areas that are covered by a specific wireless network, etc. Many variations can be envisioned by those having ordinary skill in the art. These techniques also can be applied to spatial regions that are not geospatial, e.g. regions of a bounded substrate, of a closed system, or of an astronomical object regarded from a non-Earthly perspective.

The flowchart and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method, comprising:
   generating a key that is associated with a first entity that is associated with a spacetime region, wherein the spacetime region represents a spatial region, a time interval, and a non-spatial feature, and wherein the first entity is associated with the spacetime region based on spacetime coordinates for the first entity;
   generating an anonymized key to be associated with the first entity from the key, the anonymized key and the key representing the spacetime region with which the first entity is associated; and
   compare the anonymized key with a previously anonymized key that is associated with a second entity to discover spacetime co-occurrence of the first entity and the second entity in the spacetime region.

2. The method of claim 1, wherein the first entity is one of: a person, a place, a thing, and an event.

3. The method of claim 2, further comprising:
   using a discovered spacetime co-occurrence to enhance a business process.

4. The method of claim 1, wherein the spacetime region comprises a plurality of dimensions, the plurality of dimensions including one or more of:
   spatial dimensions describing the spatial region, the spatial dimensions including one or more of: a longitude coordinate and a latitude coordinate,
   non-spatial dimensions describing the spatial region, and
   a temporal dimension describing the time interval.

5. The method of claim 4, wherein a granularity of one or more dimensions is configurable.

6. The method of claim 4, wherein the temporal dimension of the spacetime region is represented as a set of numerical values that represent one or more of:
   a year, a month, a day, an hour, a minute, a second, and a millisecond.

7. The method of claim 4, further comprising:
   receiving data representing an observation of the first entity, wherein the data includes a precision of at least one dimension; and
   associating the data with the spacetime region based on a qualification criterion.

8. The method of claim 7, wherein the qualification criterion is related to a granularity of at least some of the dimensions and is one of: a predefined qualification criterion and a dynamically derived qualification criterion.

9. The method of claim 7, further comprising:
   in response to determining that the precision of the received data indicates that the first entity qualifies to be associated with one or more adjacent spacetime regions, associating the received data with the one or more adjacent spacetime regions.

10. The method of claim 1, wherein the anonymized key is created by using one of: a reversible cryptographic algorithm and an irreversible cryptographic algorithm.

11. The method of claim 1, further comprising:
    storing the discovery of the spacetime co-occurrence of the first entity with the second entity.

12. The method of claim 1, further comprising:
    determining whether the first entity is associated with a particular set of one or more spacetime regions on at least a certain number of occasions over a certain time interval; and
    in response to a positive determination, flagging the first entity as a hanging out entity.

* * * * *